United States Patent [19]

Turner et al.

[11] Patent Number: 4,686,242

[45] Date of Patent: Aug. 11, 1987

[54] POLYUREA POLYMERS PREPARED FROM UREA CONTAINING PREPOLYMERS

[75] Inventors: Robert B. Turner; Richard D. Peffley; Raymond A. Plepys; Ralph D. Priester; Manuel Gonzales, Jr.; Kimbley A. Bushman, all of Lake Jackson, Tex.

[73] Assignee: The Dow Chemical Company, Midland, Mich.

[21] Appl. No.: 824,407

[22] Filed: Jan. 31, 1986

Related U.S. Application Data

[63] Continuation-in-part of Ser. No. 715,307, Mar. 25, 1985, abandoned.

[51] Int. Cl.$^4$ .............. C08G 18/14; C08G 18/32; C08G 18/50
[52] U.S. Cl. .................... 521/137; 521/163; 521/167; 528/64; 528/68
[58] Field of Search ............ 521/163, 167, 137; 528/64, 68

[56] References Cited

U.S. PATENT DOCUMENTS

| | | | |
|---|---|---|---|
| 2,692,873 | 10/1954 | Langerak et al. | 528/48 |
| 3,073,802 | 1/1963 | Windemuth et al. | 528/58 |
| 3,666,788 | 5/1972 | Rowton | 528/67 |
| 4,157,427 | 6/1979 | Ferber | 521/133 |
| 4,190,711 | 2/1980 | Zarahala et al. | 521/112 |
| 4,218,543 | 8/1980 | Weber et al. | 528/52 |
| 4,297,444 | 10/1981 | Dominguez et al. | 521/160 |
| 4,433,067 | 2/1984 | Rice et al. | 521/51 |
| 4,444,910 | 4/1984 | Rice et al. | 521/51 |
| 4,474,900 | 10/1984 | Dominguez | 521/110 |

FOREIGN PATENT DOCUMENTS

3342864 6/1985 Fed. Rep. of Germany.

OTHER PUBLICATIONS

Chem. Abs. 103: 88890u.

*Primary Examiner*—John Kight
*Assistant Examiner*—D. Daley

[57] ABSTRACT

This invention comprises a process whereby an amine functional compound having an equivalent weight of at least about 400 is reacted with an excess of a polyisocyanate to form an isocyanate-terminated prepolymer or quasi prepolymer, which polymer or quasi prepolymer is reacted with an isocyanate-reactive material which is preferably a relatively low equivalent weight polyol or mixture thereof with an additional amount of said amine functional compound or a relatively high equivalent weight polyol to form a polyurea containing polymer which is preferably non-cellular or microcellular.

22 Claims, No Drawings

POLYUREA POLYMERS PREPARED FROM UREA CONTAINING PREPOLYMERS

CROSS REFERENCE TO RELATED APPLICATION

This application is a continuation-in-part of application Ser. No. 715,307, filed Mar. 25, 1985 and now abandoned.

BACKGROUND OF THE INVENTION

This invention relates to a process for preparing polyurea and/or polyurea-polyurethane polymers, particularly non-cellular or microcellular elastomeric and structural polyurea-containing polymers.

Polyurethane polymers are well known and used to make a wide variety of elastomeric, structural and foamed articles. These polymers have been conventionally prepared by reacting a polyisocyanate with what is commonly referred to as a "polyol", i.e. a moderate to high equivalent weight polyhydroxyl-containing compound. The polyol provides "soft segments", i.e. flexible segments which provide good impact strength, elongation and other desirable properties to the polymer. Often, a "chain extender", i.e., a lower equivalent weight polyhydroxyl or polyamine containing compound, is also used to provide crosslinking or "hard segments" in the polymer. These chain extenders impart increased modulus and other desirable properties to the polyurethane.

It has been discovered that not only the mere presence of the hard and soft segments but the manner in which these respective segments are distributed throughout the polymer has great effect on its properties. Generally, it has been found that certain properties of the polymer are maximized when the hard and soft segments are well "segregated". Segregation of these domains refers to the presence at a microscopic or sub-microscopic level of regions containing a high proportion of hard segments and other regions containing a high proportion of soft segments.

This desired phase segregation can be accomplished in polyurethane polymers by sequentially reacting the polyisocyanate with all or part of the "polyol" prior to the subsequent reaction thereof with the chain extender and the remainder, if any, of the polyol. In this manner a soft segment prepolymer is formed prior to the formation of the final polymer. Such a technique is described, for example, in U.S. Pat. No. 4,297,444.

As an alternative, it is possible to employ a hard segment prepolymer by reacting the polyisocyanate sequentially with all or part of the chain extender and then with the polyol and any remaining chain extender.

In a separate attempt to improve polyurethane polymers, the hydroxyl-terminated materials commonly employed to make the polymer have been replaced to a greater or lesser extent with amine functional compounds. See, for example, U.S. Pat. Nos. 4,444,910 and 4,530,941. The amine functional material gives rise to urea linkages instead of urethane linkages in the polymer. Compared to the urethane linkages, these urea linkages are stronger and more thermally stable.

Although these amine functional materials have the aforementioned advantages, several serious problems are presented by their use. Amines react so rapidly with isocyanate groups that their use is generally restricted to reaction injection molding (RIM) processes. Even in RIM processes, it has been found generally necessary to employ sterically hindered amine chain extenders like diethyltoluenediamine (DETDA) in order to slow the polymerization reaction enough so that a molded article can be made. Further, amines are known to engage in a variety of secondary reactions with isocyanates at room temperature, causing undesirable crosslinking and gel formation in polyurea-containing polymers. It would be desirable to provide a polyurea polymer which is more easily processible.

In addition, it is always beneficial to provide polymers having improved physical properties and processability.

Accordingly, it would be desirable to provide a process for preparing polyurea containing polymers which provides for greater processing flexibility and a product polymer having physical properties which are equivalent to or superior than those exhibited by conventionally prepared polyurea polymers.

SUMMARY OF THE INVENTION

This invention is such an improved process for preparing polyurea-containing polymers.

This invention comprises a process whereby an amine functional compound having an equivalent weight of at least about 400 is reacted with an excess of a polyisocyanate to form an isocyanate-terminated prepolymer or quasi-prepolymer, which polymer or quasi-prepolymer is reacted with at least one isocyanate reactive material to form a polyurea containing polymer.

Several unexpected advantages are obtained with the process of this invention. The reaction of the isocyanate-terminated prepolymer or quasi-prepolymer with an isocyanate reactive material proceeds unexpectedly slowly even when such isocyanate reactive material is an amine. This longer cure time permits much greater flexibility in the processing of polymers according to this invention. When glycols or relatively slow-reacting amines are used as the isocyanate-reactive material, it is usually possible even to hand mix and cast the reacting materials. Of course, the reaction mixture can be catalyzed to provide speedier cures as are often desired in RIM processing. In addition, the process of this invention often permits the use of highly reactive amines such as ethylene diamine and toluene diamine as the isocyanate reactive material. Such highly reactive amines are generally too reactive for use according to conventional processes, even in RIM systems. However, with this invention it is often possible to employ such amines to prepare molded articles, particularly via a RIM process.

The polymer prepared according to this process also exhibits unexpected properties. Polymers prepared according to this invention generally exhibit a glass transition temperature which is about 5° to 20° C. lower than that exhibited by a similar polymer prepared according to a one-shot process. This advantage is especially evident when an aliphatic polyisocyanate is used. In addition, the heat distortion temperature of these polymers, as measured by a heat sag test, is usually significantly higher than conventionally prepared urea-containing polymers of similar flexural modulus. Thus, this invention provides polymers which are useable or processible over a wider temperature range than similar polymers prepared according to a one-shot process.

DETAILED DESCRIPTION OF THE INVENTION

According to this invention, an isocyanate-terminated prepolymer or quasi-prepolymer is reacted with an isocyanate reactive material to form a urea-containing polymer. This polymer is preferably noncellular or microcellular. The term "isocyanate-reactive material" as used herein refers to a compound or mixture thereof containing two or more hydrogen atoms which are active according to the Zerewitnoff test described by Kohler in the Journal of the American Chemical Society, Vol. 49, p. 3181 (1927). The isocyanate reactive material preferably comprises a low equivalent weight polyol or polyamine (sometimes referred to herein as a "chain extender".)

The isocyanate-terminated polymer or quasi-prepolymer comprises a reaction product of an amine functional compound or mixture thereof and a stoichiometric excess of a polyisocyanate. The term "prepolymer" is used herein to indicate an isocyanate-terminated entity that is formed in the reaction of an amine-functional compound and a polyisocyanate. The term "quasi-prepolymer" is employed herein to indicate a prepolymer-containing mixture which also contains unreacted polyisocyanate. A quasi-prepolymer can be prepared by reacting said amine-terminated compound with an amount of a polyisocyanate greater than that needed to react with the amine groups thereon so that excess unreacted polyisocyanate is present in the product. Alternatively, the quasi-prepolymer can be prepared by forming a prepolymer and then mixing it with additional polyisocyanate. Preferred are prepolymers or quasi-prepolymers which have an —NCO content of about 3–25, more preferably about 3–12% by weight.

The terms "amine functional compound" or "amine functional material" as used herein refer to compounds or mixtures thereof which contain at least one amine group having an active hydrogen atom which is capable of reacting with an isocyanate group to form a urea. Said amine functional compound or material preferably contains an average of at least two such amine groups, or one such amine group and at least one other functional group containing an active hydrogen atom. The amine-functional compound also has an equivalent weight of at least about 400. For the purposes of this invention the equivalent weight of the amine functional compound or material is based on the number of amine groups (or other groups containing active hydrogen atoms) as opposed to the number of hydrogen atoms. For example, a 2000 molecular weight compound containing two primary amine groups is considered herein to have an equivalent weight of 1000.

Preferred are primary or secondary amine-terminated polyethers having an equivalent weight of about 400 to 6000, preferably from about 500 to 3000 and containing an average of about 1 to about 4 amine groups per molecule. Suitable such amine-terminated polyethers and methods of their preparation are described, for example, in U.S. Pat. Nos. 3,654,376, 3,666,788, and copending application Ser. No. 654,717 (Gurgiolo). Generally, the processes described in these patents comprise reacting a hydroxyl-terminated polyether with hydrogen and ammonia or a primary amine in the presence of certain catalysts to reductively aminate the polyether.

The production of primary amine terminated polyethers is particularly described in U.S. Pat. No. 3,654,376. Commercially available primary amine-terminated polyethers include Jeffamine T-5000, Jeffamine D-2000 and Jeffamine D-400, all available from the Jefferson Chemical Company.

The preparation of secondary amine-terminated polyethers is particularly described in U.S. Pat. Nos. 4,152,353, 4,153,581, 3,666,788 and copending application Ser. No. 654,717. Generally, polyether polyols which have been capped with an aliphatic primary amine, especially a $C_1$ to $C_6$ aliphatic amine, and aromatic amine capped materials, especially aniline-capped polyethers, are preferred.

In most of the foregoing processes, the amination of the polyether preceeds less than quantitatively. Accordingly, the product will contain compounds having only one amine group per molecule and some residual hydroxyl groups. The use of such materials is suitable in this invention provided that of the combined number of hydroxyl groups and amine groups, at least about 25%, preferably at least about 50%, and more preferably about 50 to 100% thereof are amine groups. In addition, mixtures of aminated materials and hydroxyl-terminated materials are suitable herein when at least 25% by number of the amine and hydroxyl groups are amine groups.

Other secondary amine-terminated polyethers are advantageously prepared by reacting a primary amine-terminated polyether as described hereinbefore with an unsaturated compound such as an acrylic ester, methacrylic ester, acrylonitrile or other compound containing a carbon-carbon double bond which is sufficiently reactive to undergo a Michael addition reaction with a primary amine terminated polyether. Reaction products of acrylonitrile and $C_1$–$C_6$ alkyl or hydroxylalkyl esters of acrylic or methacrylic acid with a primary amine-terminated polyether are of particular significance herein. In addition, a secondary amine-terminated polyether formed by reacting the corresponding primary amine-terminated polyether with an adduct of formaldehyde and hydrogen cyanide is also useful herein. The reactions described in this paragraph are advantageously conducted by heating the reactants in the presence of a suitable diluent such as a lower alcohol. Suitable reaction conditions are described in U.S. Pat. No. 3,666,788.

In addition to the foregoing, it is also within the scope of this invention to employ as the amine-functional compound a primary or secondary amine terminated material which is complexed with an acid, acid halide or alkyl chloride, bromide or iodide. Of particular interest are primary or secondary amine terminated polyethers which are complexed with an organic acid halide such as benzoyl chloride or acetyl chloride, a phosphorus acid, a halogen acid, or a $C_1$–$C_4$ alkyl iodide.

The amine-functional compound is reacted with an excess of a polyisocyanate to form an isocyanate-terminated prepolymer or quasi-prepolymer. Aromatic polyisocyanates, i.e. those in which the isocyanate groups are attached directly to aromatic rings, as well as aliphatic isocyanates are useful herein.

Typical aromatic polyisocyanates useful herein include phenyl diisocyanate, 2,6-toluene diisocyanate, 2,4-toluene diisocyanate, ditoluene diisocyanate, naphthalene 1,5-diisocyanate, bis(4-isocyanatophenyl)methane (MDI), bis(3-methyl 2-isocyanato phenyl)methane, bis(3-methyl 4-isocyanatophenyl)methane, bis(3,5-diisopropyl-4-amino phenyl)methane, 4,4'-diphenylpropylidene diisocyanate, 4,4'-diphenyl ethane diisocyanate and diverse polymethylene polyphenyl polyisocyanates. Of these, toluene diisocyanate, bis(4- isocyanatophenyl)methane (MDI) and polymethylene polyphenyl polyisocyanates are preferred on the basis of ready availability and generally superior performance. The polymethylene polyphenyl polyisocyanates typically employed herein are those that have an average functionality of from about 2.1 to about 3.5 and contain about 20 to 100 weight percent methylene diphenyldiisocyanate isomers with the remainder being polymethylene polyphenyl polyisocyanates of higher molecular weight. These isocyanate mixtures are known, commercially available materials and can be prepared by the process described in U.S. Pat. No. 3,362,679.

Suitable organic aliphatic polyisocyanates include, in addition to the halogenated derivatives of the above mentioned organic aromatic polyisocyanates, 1,6-hexamethylene diisocyanate, isophorone diisocyanate, 1,4-cyclohexyl diisocyanate, 1,4-bis(isocyanatomethyl)cyclohexane methylene bis(4-cyclohexylisocyanate) or mixtures thereof.

The reaction of the polyisocyanate and the amine containing material can be conducted neat or in a suitable solvent. Due to the great reactivity of the amine functional compound it tends to form polymers of significant molecular weight upon contact with the polyisocyanate. Such higher molecular weight materials are often insoluble in the unreacted polyisocyanate and form precipitates which hinder processing. The formation of higher molecular weight materials also causes the prepolymer or quasi-prepolymer to have a broad molecular weight distribution which also may adversely affect the properties of the product polymer. Conditions for the prepolymer-forming reaction are therefore advantageously selected such that the formation of these higher molecular weight materials are minimized.

The formation of higher molecular weight materials can generally be minimized by conducting the reaction in such a manner that the formation of high local concentrations of the amine-functional compound in the polyisocyanate is minimized. This is readily accomplished, for example, by gradually adding the amine-functional material to the polyisocyanate under conditions of agitation. Alternatively, particularly when a more highly reactive polyisocyanate and amine functional material are used, the reaction can be conducted in a suitable solvent.

Generally, the prepolymer-forming reaction is conducted at moderate temperatures, i.e. about $-10°$ to $100°$ C., preferably about $15°-55°$ C. Lower temperatures, i.e. $-10°$ to $30°$ have an added benefit of slowing the reaction so as to inhibit the formation of high molecular weight materials, and are sometimes preferred for that reason. However, at higher temperatures, the reduced viscosity of the amine-containing material permits more rapid intermixing of the component, which also tends to reduce the formation of high molecular weight materials. Obviously, at higher temperatures, it is sometimes difficult to control the formation of high molecular weight materials.

The reaction is conducted until substantially all the amine groups on the amine-functional compound have reacted with the polyisocyanate. Due to the reactivity of the amine-functional compounds this reaction is completed almost instantaneously in most cases. When a blend of the amine functional material and a polyol are employed to prepare the prepolymer, a somewhat larger reaction period may be required, i.e. 5 minutes to two hours.

It is often desirable to store the prepolymer for an extended period (i.e. several hours to several months) before using it to prepare a polymer. In such cases, it is desirable to prepare a prepolymer which is stable, i.e. does not engage in substantial amount of secondary reactions during storage. Such stability is conventionally measured by determining the —NCO contact of the prepolymer over an interval of time. A decrease in the —NCO content of less than about 2 percent by weight of the prepolymer generally indicates adequate stability.

Generally, the stability of the polyurea isocyanate-terminated prepolymer or quasi-prepolymer depends somewhat on its composition, and more particularly on the particular polyisocyanate used and the degree of amination of the amine-functional compound. Generally, stability is favored by the use of less reactive polyisocyanates and the use of amine functional compounds which are less than quantitively aminated. In addition, secondary amine-terminated amine functional compounds and those amine functional materials which are complexed with acids, acid halides or other halides as described hereinbefore, generally form more stable prepolymers than do primary amine terminated materials. Secondary amine-terminated polyethers which are prepared by reacting the corresponding primary amine with an unsaturated compound in a Michael addition reaction form particularly stable prepolymers, even with highly reactive polyisocyanates.

Aliphatic polyisocyanates readily form stable prepolymers with primary amine terminated compounds having a degree of amination up to 100%. When reacted with a secondary amine terminated compound, particularly stable prepolymers are formed at all degrees of amination.

Aromatic polyisocyanates of moderate reactivity, or which have at least one moderately reactive isocyanate group and one or more highly reactive isocyanate groups, such as 2,4-toluene diisocyanate and 2,4'-methylene diphenyl diisocyanate, generally from stable prepolymers with primary amine terminated compounds having a degree of amination of about 25-90%, preferably 25-75%, more preferably about 25-50%. When reacted with an arylamine-terminated material, these polyisocyanates typically form a stable prepolymer when the degree of amination is about 25-100% and preferably about 25-75%. When an alkylamine-terminated material is used to prepare prepolymers with these compounds it is advantageous that it have a degree of amination of about 25-80%, preferably about 25-65%. A moderately reactive isocyanate group is for the purpose of this invention, one which has a reactivity intermediate to that of an aliphatic polyisocyanate, which is less reactive, and MDI, which is a highly reactive polyisocyanate.

Highly reactive polyisocyanates such as diphenyl methane diisocyanate and polymeric derivatives thereof typically form stable prepolymers with primary amine terminated materials having a degree of amination from about 25-85%, preferably about 25-50%, and with secondary amine-terminated materials having a degree of amination of about 25-100%, preferably about 25-70%, more preferably about 40-70%.

The prepolymer or quasi prepolymer is reacted with at least one isocyanate-reactive material to form a polymer which is preferably non-cellular or microcellular. A polymer is considered to be non-cellular or microcellular if it has a density (unfilled) of at least 0.8 g/cc. Preferably, the polymer has a density of at least about 0.9 g/cc, more preferably about 0.95–1.2 g/cc (unfilled). Said isocyanate-reactive material preferably comprises a relatively low equivalent weight compound having two or more active hydrogen atoms and optionally an additional amount of an amine functional compound or other relatively high equivalent weight isocyanate-reactive material.

The conditions of the polymerization reaction depend somewhat on the composition of the isocyanate reactive material and the prepolymer or quasi-prepolymer employed in the reaction mixture. When a relatively reactive isocyanate group is present in the prepolymer or quasi prepolymer, or when particularly reactive isocyanate-reactive materials are used, it is desirable to employ reaction conditions which promote rapid mixing and slow reaction of the components. In such instances, it is preferred to mix and react the components at a temperature from about $-10°$ to 40° C. in the presence of little or no catalyst and using a mechanical mixing apparatus which can rapidly mix the components and transfer the mixture into a mold. Preferably, RIM type equipment is employed. Once the material is transferred into a mold, greater temperatures can be used to complete the curing reaction.

When the prepolymer or quasi-prepolymer contains less reactive isocyanate groups and/or the isocyanate reactive material is relatively less reactive, greater flexibility in reaction conditions is possible. In these cases the reactants can be contacted at ambient to elevated temperatures, i.e. $-10°$ to 100° C., can be catalyzed if desired and can be either hand or machine mixed. A speedier reaction as is desirable for RIM processing is readily accomplished with the addition of catalyst or the use of higher reaction temperatures, i.e. 30°–100° C.

The relatively low equivalent weight polyahl useful herein includes those compounds containing a plurality of moieties containing hydrogen atoms which are active according to the Zerewitnoff test described by Kohler in the Journal of the Americal Chemical Society, Vol. 49, page 3181 (1927). Exemplary such moieties include mercaptan, hydroxyl, primary and secondary amine, and acid groups. Preferred are amine and hydroxyl-containing compounds. The relatively low equivalent weight polyahl additionally has an equivalent weight of less than about 200, preferably about 30 to about 150.

Suitable hydroxyl-containing chain extenders include for example, ethylene glycol, propylene glycol, trimethylol propane, 1,4 butane diol, diethylene glycol, dipropylene glycol, bisphenols, hydroquinone, catechol, resorsinol, triethylene glycol, tetraethylene glycol, glycerine, low molecular weight ethylene- and/or propylene oxide derivaties of glycerine, ethylene diamine, diethylene triamine, mixtures thereof and the like.

Suitable aliphatic amine-containing compounds include, for example, ethylenediamine, 1,3-diamino propane, 1,4 diaminobutane, isophorone diamine, diethylene triamine, ethanolamine, aminoethylethanolamine, diaminocyclohexane, hexamethylenediamine, aminoethyl piperazine, bis(aminopropyl) piperazine, 1,2-diamino cyclohexane, poly(oxyalkylene) amines, bis (p-aminocyclohexyl) methane, triethylene tetraamine, mixtures thereof and the like. Particularly suitable are aminated polyoxypropylene glycols having an average equivalent weight of about 60 to about 110, although these materials are usually employed in conjunction with another amine or glycol chain extender.

Suitable aromatic amines which can be employed herein include for example, 2,4-bis (p-aminobenzyl) aniline, 2,4-diaminotoluene, 2,6-diaminotoluene, 1,3-phenylenediamine, 1,4-phenylenediamine, 2,4'-diaminodiphenyl methane, 4,4'-diaminodiphenyl methane, naphthalene 1,5-diamine, 1 methyl-2-methylamino 4-amino benzene, polyphenyl polymethylene polyamines, 1,3-diethyl 2,4-diaminobenzene, 1-methyl-3,5-diethyl-2,6-diamino benzene, 1,3,5- triethyl 2,6-diamino benzene, mixtures thereof and the like. Those of the aforementioned aromatic amines which are substituted in each position ortho to an amino group are significantly sterically hindered and react much more slowly than those aromatic amines which are unsubstituted in one or more of the positions ortho to the amine groups.

The prepolymer or quasi prepolymer may be reacted with a relatively high equivalent weight polyol such as a polyether polyol, polyester polyol, the so-called polymer or copolymer polyols, hydroxyl-terminated acetal resins, polyhydroxyl containing phosphorous compounds and the like. Examples of these and other suitable polyols are described in columns 3–5 of U.S. Pat. No. 4,394,491, incorporated herein by reference. Most preferred are those having an equivalent weight from about 400–5000 and an average functionality of about 2–4, especially 2–3.

In addition to the foregoing components, it is often desirable to incorporate various other ingredients into the reaction mixture. It has already been mentioned that a catalyst for the polymerization reaction may be employed in certain circumstances. Suitable such catalysts commonly include tertiary amines and organo-metal compounds. The organometallic catalyst is suitably a lead, mercury or stannous compound such as a stannous carboxylate, a trialkyl tin oxide, a dialkyl tin dihalide, a dialkyl tin oxide and the like wherein the organic groups of the organic portion of the tin compound or hydrocarbon groups contain from about 1 to about 8 carbon atoms. For example, dibutyltin dilaurate, dibutyltin diacetate, diethyltin diacetate, stannous octoate, di (2-ethylhexyl) tin oxide, stannous oleate or mixtures thereof may be used. Tertiary amine catalysts include trialkyl amines, heterocyclic amines such as alkylmorpholines, 1,4 dimethylpiperazine, triethylene diamine, and aliphatic polyamines such as N,N,N'N'tetramethyl 1,3-butanediamine.

Blowing agents may also be employed herein to form a cellular polymer. However, the formation of a cellular polymer is not preferred. Blowing agent can be used, however, to slightly expand the polymer to form a microcellular structure, as long as the polymer has a density of at least about 0.8 g/cc. Suitable blowing agents include low boiling halogenated hydrocarbons such as trichloromonofluoromethane and methylene chloride, carbon dioxide, nitrogen, water or other known materials which volatilize or otherwise form a gas under the conditions of the polymerization reaction.

Other conventional formulation ingredients may also be employed such as stabilizers, extenders, inert fillers, such as glass fibers, carbon fibers, pigments and the like. Internal mold release agents such as disclosed in European Patent Publication No. 119,471 and the copending application Ser. No. 641,883 of Nelson et al. are also suitable for use herein.

The polymer prepared according to this invention is useful as a static or dynamic elastomer, such as employed, for example in preparing fascia for automobile bumpers, or as a foamed cushion, as are used in automobile dashboards, headrests, and the like.

The following examples are provided to illustrate the invention but are not intended to limit the scope thereof. All parts and percentages are by weight unless otherwise indicated.

EXAMPLE 1

To a resin kettle equipped with a stirrer, heating lamp and nitrogen atmosphere are added 84 g. of hexamethylene diisocyanate (HMDI). The HMDI is heated to 40° C. With stirring, 250 g. of a difunctional 2000 molecular weight primary amine terminated poly(propylene oxide) are added over a period of 2 hours. As the amine is added, the viscosity of the reaction mixture is seen to increase, indicating prepolymer formation. Following the addition of amine, a clear colorless viscous liquid is obtained.

Three portions of about 10-15 g. of the prepolymer are hand mixed with diethyltoluenediamine (DETDA) at a 95, 100, and 105 index, respectively at room temperature in the absence of a catalyst. The reacting mixtures are placed in a ⅛" deep mold and cured for 30 minutes at 53° C. The gel time for each reaction is about 2.0 minutes and curing is complete after 10 minutes.

The physical properties of the resulting moldings are: tensile strength 2179 psi; flexural modulus—18,050 psi, elongation—397%; die "C" tear strength—601 p.l.i., Shore D hardness—45; heat sag (at 325° F. for 30 minutes with 5 inch overhang)—0.4 inches.

EXAMPLE 2

Using the general procedure described in Example 1, 16.9 g. of hexamethylene diisocyanate are reacted with 50 g (0.05 moles) of an aminated polypropylene oxide diol containing 50% primary amine groups, 37% methyamine groups, 10% dimethyl amine groups and 3% hydroxyl groups. The aminated diol is prepared accordingly by reacting methyl amine with the diol in a tube reactor according to the general process described in U.S. Pat. No. 4,152,353. The weight ratio of methyl amine to diol is 0.35. The reaction is conducted at a temperature of 265° C. and a pressure of 1100 psi and hydrogen is fed to the reactor at a rate of 2 cubic feet/hour. A prepolymer having a —NCO content of about 8.9% is obtained. This prepolymer is reacted at a 1.05 index with DETDA by hand mixing the components and pouring the reacting mixture onto a mold which is preheated to 300° F. The gel time for this reaction is about 30 seconds. The polymer is cured at 300° F. for 60 minutes. The resulting elastomer has a glass transition temperature of about $-55°$ C., compared to an expected value of about $-40°$ C.

EXAMPLE 3

In a suitable flask, 99 grams of hexamethylene diisocyanate are placed under a nitrogen atmosphere. To the flask are added, dropwise under constant agitation, 300 grams of an aminated polypropylene oxide diol as described in example 3. A prepolymer having an —NCO content of 9.25% is obtained.

After storing overnight, 209 g of the prepolymer and 41 g of DETDA are reacted by degassing the prepolymer, adding the DETDA and again degassing at room temperature, and pouring the mixture onto a mold which is preheated to 100° F. The molding is cured at 300° F. for 30 minutes at 10,000 psi pressure. The properties of the resulting molding are: flexural modulus—11,900 psi; tensile strength—1,180 psi, die "C" tear strength—405 p.l.i.; elongation—163%; heat sag (325° F. for 30 minutes with 4" overhang)—0.16"; $T_g = -55°$ C.

EXAMPLE 4

Following the general procedure described in Example 3, 16.65 g of MDI and 23.3 g of an aminated difunctional 2000 molecular weight poly(propylene oxide) are reacted to form a prepolymer having an —NCO content of 10.1%. The aminated material is prepared by reacting aniline with a 2000 molecular weight polyol according to the general process described in U.S. Pat. No. 4,152,353. The reaction is conducted using 0.9 parts by weight of aniline per part polyol. The temperature is about 205° C. and the pressure is 600 psi. Hydrogen is fed to the reactor at the rate of 10 cubic feet/hour. The resulting aminated polyol contains 40% primary amine, 39% saturated secondary amino terminal group, 4% aniline groups and about 11% residual hydroxyl groups. About 20.6 g of this prepolymer are reacted with 4.41 g of DETDA by hand mixing the components to form a castable elastomer. The resulting polymer has a glass transition temperature of $-53°$ C.

EXAMPLE 5

A prepolymer is prepared as described in Example 3 using 14.6 g of toluene diisocyanate and 35.4 g of the aminated material of Example 4. A prepolymer having an —NCO content of 9.23% is obtained. Twenty grams of this prepolymer are reacted with 3.82 g DETDA as described in Example 3. The resulting polymer has a glass transition temperature of $-46°$ C.

EXAMPLE 6

According to the method described in Example 3, 36.7 g of a 2000 molecular weight isopropylamine-terminated difunctional poly(propylene oxide) and 13.3 g of hexamethylene diisocyanate are reacted to form a prepolymer having an —NCO content of about 9.5%. This prepolymer is reacted with DETDA at a 100 index by hand stirring the components at room temperature, and pouring the mixture onto a mold (12"×7"×⅛") heated at 100° F. The mold is then cured for 30 minutes at 300° F. and 10,000 psi. The tensile strength at the resulting molding is 2409 psi. Elongation is 503%, flexural modulus is 32,400 psi, die "C" tear strength is 401 pounds per linear inch, and glass transition temperature is $-56°$ C. The molding sags 0.2" in 30 minutes at 325° F. with a 6" overhang.

EXAMPLE 7

A 2000 molecular weight difunctional primary amine terminated poly(propylene oxide) is reacted with ethyl iodide at a 2:1 mole ratio by mixing at room temperature for about 3 hours. A methylene chloride solution containing 15.6 parts of the product is reacted with a solution of 21.2 grams MDI in 100 grams methylene chloride by adding the amine solution dropwise under constant vigorous agitation to the MDI solution at room temperature. After the addition of the amine solution, the mixture as stirred for about 1 hour at room temperature. The solvent is then stripped off under vacuum to yield a 16.4% —NCO prepolymer. The prepolymer is chain extended with 1,4-butane diol at a 105 index to provide a polymer having a glass transition temperature of $-32.5°$ C. and a crystalline melting point of 189° C.

EXAMPLE 8

A primary amine-terminated poly(propylene oxide) triol sold commercially as Jeffamine T-5000 is reacted with acrylonitrile to form a derivative containing terminal mono(cyanoethyl) amine groups. This derivative is added dropwise at room temperature to MDI in proportions sufficient to yield a 12% —NCO prepolymer. The resulting prepolymer is reacted with 1,4 butane diol according to the general procedure described in Example 3 at a 1.05 index to yield an elastomer having a tensile strength of about 1270 psi, a flexural modulus of 22,600 psi, an elongation of 310% a die "C" tear strength of 390 p.l.i. and a heat sag (at 250° F. for 60 minutes with a 4" overhang) of 0.15 inches.

EXAMPLE 9

A series of polyurea-polyurethane elastomers is prepared in dimethylacetimide solution by prereacting MDI with an animated polyether to form a 12% —NCO prepolymer, and chain extending with 1,4-butanediol. Each polymer is precipitated in methanol and dried under vacuum. The thermal properties of each sample are tested by annealing the polymer at 120° C. for five minutes in the chamber of a differential scanning calorimeter (DSC), and then conducting a DSC scan to determine the glass transition temperature ($T_g$) of the hard segment and soft segment of each polymer. The aminated polyether used in each sample, and the hard and soft segment $T_g$ are as indicated in Table I following. All aminated polyethers are prepared from a 2000 molecular weight poly(propylene oxide) diol.

TABLE I

| Sample | Aminated Polyether | Soft Segment $T_g$ | Hard Segment $T_g$ |
|---|---|---|---|
| A | —NHCH$_2$CH$_2$CN capped | −40° C. | 200, 210, 228° C. |
| B | cyclohexyl amine capped | −47° C. | 201° C. |
| C | isopropylamine capped | −46° C. | 197° C. |
| D | ethylamine capped | −41° C. | 197° C. |
| E* | hydroxyl terminated (control) | −35° C. | 190° C. |

*Not an example of this invention

The soft segment $T_g$ defines the lower end of the useful temperature range for the polymer. The hard segment $T_g$ defines the upper end. As can be seen from the data in Table I, each of the polymers prepared according to this invention has both a lower soft segment $T_g$ and a higher hard segment $T_g$. In a practical application, such as an automobile bumper, the lower soft segment $T_g$ means that the bumper will remain flexible, and not become brittle, at colder temperatures than the control. Further, the higher hard segment $T_g$ indicates that the polymer will better withstand a hot environment such as is encountered with in-line baked-cure painting procedures.

What is claimed is:

1. A process for preparing a polyurea or polyurea-polyurethane polymer comprising reacting an amine functional compound having an equivalent weight of at least about 400 with an excess of a polyisocyanate to form an isocyanate-terminated prepoymer or quasi-prepolymer, and then reacting said isocyanate-terminated prepolymer or quasi-prepolymer with an isocyanate reactive material to form a polyurea and/or polyurea-polyurethane polymer.

2. The process of claim 1 wherein said amine functional compound has an average equivalent weight of about 500–3000 and contains about 1–4 amine groups per molecule.

3. The process of claim 2 wherein the amine-functional compound is an amine-terminated polyether.

4. The process of claim 3 wherein said amine functional compound contains terminal primary amine groups.

5. The process of claim 4 wherein the polyisocyanate is an aliphatic polyisocyanate.

6. The process of claim 4 wherein the polyisocyanate comprises an aromatic polyisocyanate containing at least one moderately reactive isocyanate group, and the degree of amination of the amine functional compound is about 25–75%.

7. The process of claim 4 wherein the polyisocyanate is an aromatic polyisocyanate containing highly reactive isocyanate groups and the amine-functional compound has a degree of amination of about 25–80%.

8. The process of claim 3 wherein said amine-functional compound contains terminal aliphatic secondary amine groups.

9. The process of claim 8 wherein said polyisocyanate contains at least one moderately reactive aromatic isocyanate group and the amine functional compound has a degree of amination of about 25–80%.

10. The process of claim 8 wherein said polyisocyanate contains highly reactive isocyanate groups and the amine-terminated compound has a degree of amination of about 25–70%.

11. The process of claim 3 wherein said amine functional compound comprises an aromatic amine terminated polyether.

12. The process of claim 11 wherein said polyisocyanate comprises an aliphatic polyisocyanate.

13. The process of claim 11 wherein said polyisocyanate comprises an aromatic polyisocyanate containing at least one moderately reactive isocyanate group.

14. The process of claim 11 wherein said polyisocyanate comprises an aromatic polyisocyanate which does not contain sterically hindered isocyanate groups and wherein the amine-functional material has a degree of amination of about 25–70%.

15. The process of claim 1, 4, 8 or 11 wherein said isocyanate reactive material comprises a polyol or polyamine having an equivalent weight of about 30–150.

16. The process of claim 15 wherein said isocyanate reactive material further comprises a polyol or amine-terminated polyether having an equivalent weight of about 400–5000 and a functionality of about 2–3.

17. The process of claim 15 wherein the prepolymer or quasi-prepolymer has an isocyanate content of about 5–12% by weight.

18. The process of claim 3 wherein said amine functional material is complexed with an organic acid halide, a phosphorus acid, a halogen acid or an alkyl halide.

19. The process of claim 3 wherein said prepolymer or quasi-prepolymer is prepared in the presence of benzoyl chloride.

20. The process of claim 3 wherein said amine functional material is a Michael reaction product of a primary amine terminated polyether and an unsaturated compound containing a carbon-carbon double bond.

21. The process of claim 20 wherein the unsaturated compound comprises acryonitrile or a $C_1$–$C_6$ alkyl or hydroxylalkyl ester of acrylic or methacrylic acid.

22. The process of claim 1, 4, 8 or 11 wherein said polyurea and/or polyurethane polymer has an unfilled density of at least 0.8 g/cc.

* * * * *